US009529536B2

(12) United States Patent
Song et al.

(10) Patent No.: US 9,529,536 B2
(45) Date of Patent: Dec. 27, 2016

(54) SEMICONDUCTOR MEMORY DEVICE, MEMORY SYSTEM INCLUDING THE SAME, AND OPERATING METHOD THEREOF

(71) Applicant: SK hynix Inc., Icheon-si Gyeonggi-do (KR)

(72) Inventors: Young-Ook Song, Seoul (KR); Hong-Sik Kim, Seongnam-si (KR)

(73) Assignee: SK HYNIX INC., Icheon-Si (KR)

( * ) Notice: Subject to any disclaimer, the term of this patent is extended or adjusted under 35 U.S.C. 154(b) by 36 days.

(21) Appl. No.: 14/504,638

(22) Filed: Oct. 2, 2014

(65) Prior Publication Data

US 2015/0355854 A1    Dec. 10, 2015

(30) Foreign Application Priority Data

Jun. 9, 2014 (KR) ........................ 10-2014-0069111

(51) Int. Cl.
*G06F 3/06* (2006.01)

(52) U.S. Cl.
CPC ........... *G06F 3/0619* (2013.01); *G06F 3/0653* (2013.01); *G06F 3/0679* (2013.01)

(58) Field of Classification Search
CPC .... G06F 3/0619; G06F 3/0653; G06F 3/0679; G11C 11/00; G11C 2013/0083; G11C 11/5678; G11C 13/0004; G11C 2213/79; G11C 13/0064; G11C 13/0069
See application file for complete search history.

(56) References Cited

U.S. PATENT DOCUMENTS

| 7,701,757 B2* | 4/2010 | Kim ..................... G11C 11/5678 365/158 |
| 8,023,345 B2* | 9/2011 | Breitwisch ......... G11C 13/0004 365/200 |
| 2011/0026318 A1* | 2/2011 | Franceschini ........... G11C 11/00 365/163 |

OTHER PUBLICATIONS

N. Papandreou et al., Drift-Tolerant Multilevel Phase-Change Memory, 2011, IEEE, IBM Research.
Guanying Wu, et al. Reducing SSD Read Latency via NAND Flash Program and Erase Suspension, Department of Electrical and Computer Engineering Virginia Commonwealth University, Richmond, USA.
Moinuddin Qureshi et al., Improving Read Performance of PCM via Write Cancellation and Write Pausing, 2007, IBM T.J. Watson Research Center, Yorktown Heights, USA.

* cited by examiner

*Primary Examiner* — David X Yi
*Assistant Examiner* — Tahilba Puche
(74) *Attorney, Agent, or Firm* — William Park & Associates Ltd.

(57) ABSTRACT

A semiconductor memory device may include a memory cell array, and a program and verify circuit configured to perform a write operation on the memory cell array by repeating a plurality of program and verify operations. When the write operation is stopped after a first program operation is performed according to a first program condition, the PNV circuit may perform a first verify operation corresponding to the first program operation according to a first target value, after the write operation has resumed.

15 Claims, 10 Drawing Sheets

| Logic Level | Lapse Time | Min Resistance | Max Resistance |
|---|---|---|---|
| 00 | 1 | | |
| 00 | N | | |
| 11 | 1 | | |
| 11 | N | | |

SEMICONDUCTOR MEMORY DEVICE, MEMORY SYSTEM INCLUDING THE SAME, AND OPERATING METHOD THEREOF

CROSS-REFERENCE TO RELATED APPLICATIONS

The present application claims priority of Korean Patent Application No. 10-2014-0069111, filed on Jun. 9, 2014, which is incorporated herein by reference in its entirety.

BACKGROUND

1. Technical Field

Various embodiments generally relate to a semiconductor device, a memory system including the same, and operating method thereof, and more particularly, to a semiconductor device of which a write operation is improved by a program and verify operation, a memory system including the same, and operating method thereof.

2. Related Art

During a write operation for a memory cell, a plurality of programming operations and verifying operations may be performed in order to accurately write data to the memory cell.

With multi-level cells two or more bits may be stored therein. Thus, creating a program condition suitable for this type of memory cell is difficult. The difficulties in creating a suitable program condition are due to characteristic changes of the cells and/or characteristic differences between the cells.

Figure 1:
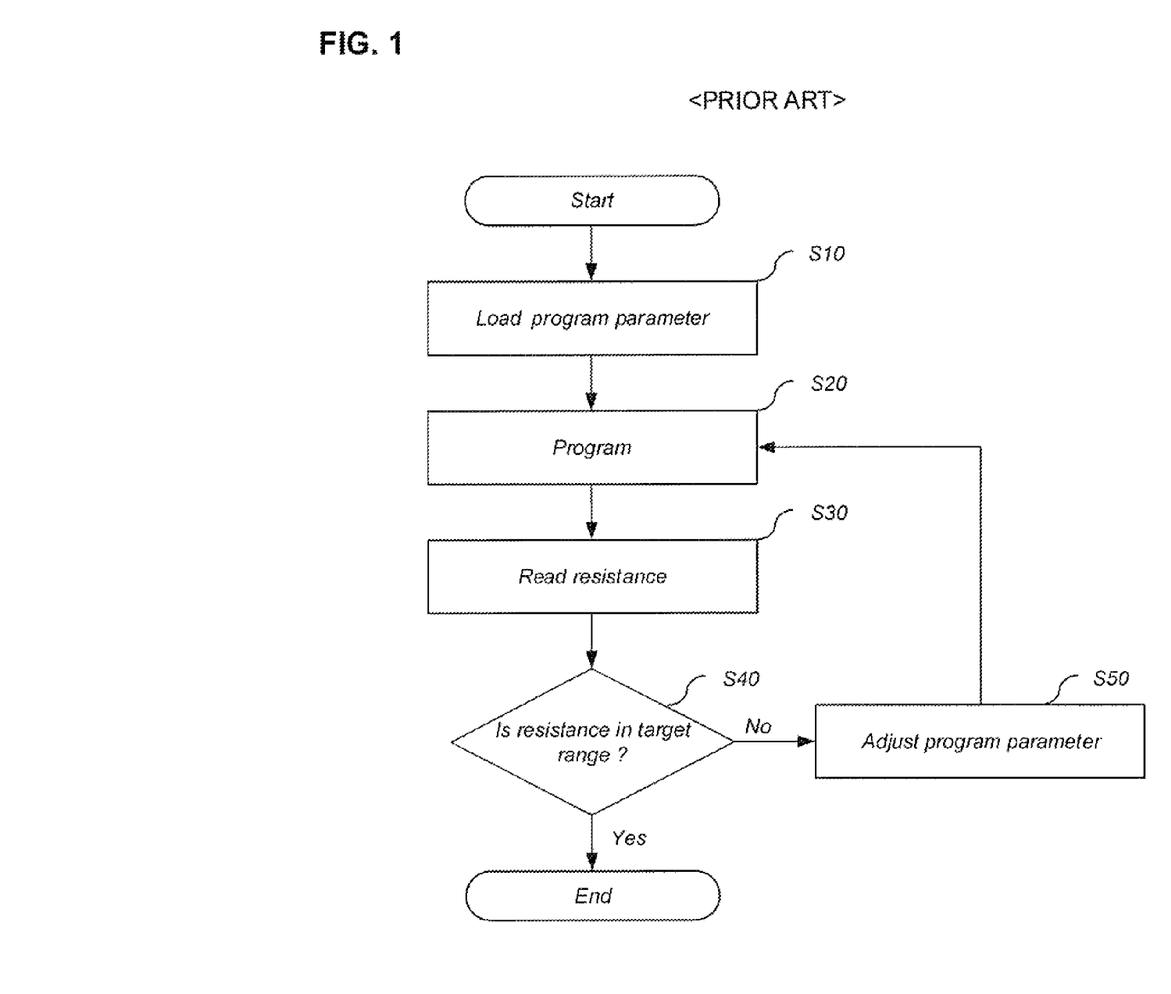
FIG. 1 is a flowchart illustrating a write operation in a conventional semiconductor device.

FIG. 1 is a flowchart illustrating a programming and verifying operation in a conventional semiconductor device.

Referring to FIG. 1, first, a program condition corresponding to the logic level of data to be written to a cell may be loaded at step S10.

Then, at step S20, the cell may be programmed according to a program condition. Next, at step S30, a resistance value of the corresponding cell may be read.

Then, at step S40, whether the resistance value of the corresponding cell is included in a target value may be verified. The target value may be given as a predetermined range defined by a minimum value and a maximum value.

When the resistance value is included in the target value, the operation may be ended. Otherwise, the program condition may be modified at step S50, and the program operation at step S20 may be performed again.

When the write operation is performed through a plurality of programming and verifying operations, it may take a relatively long time to perform the write operation.

Figure 2:
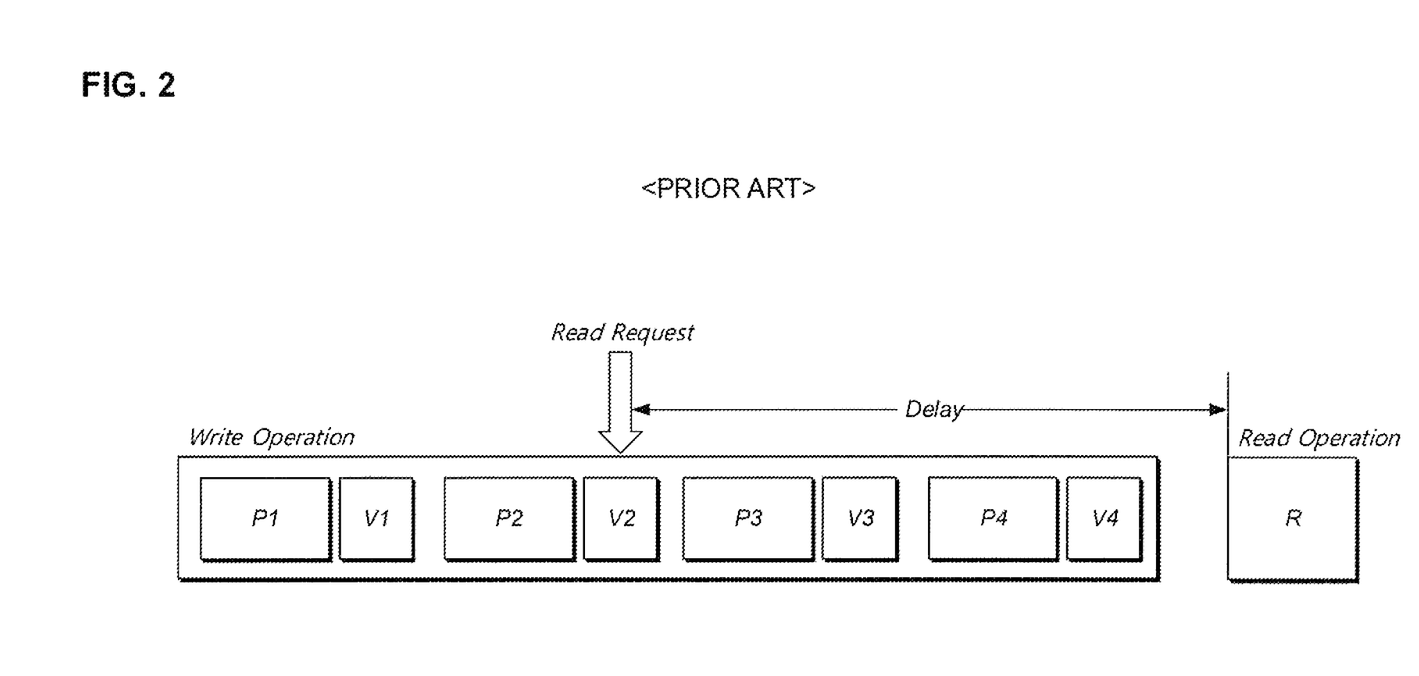
FIGS. 2 and 3 are diagrams for explaining the problems associated with the conventional semiconductor device during a write operation.
Figure 3:
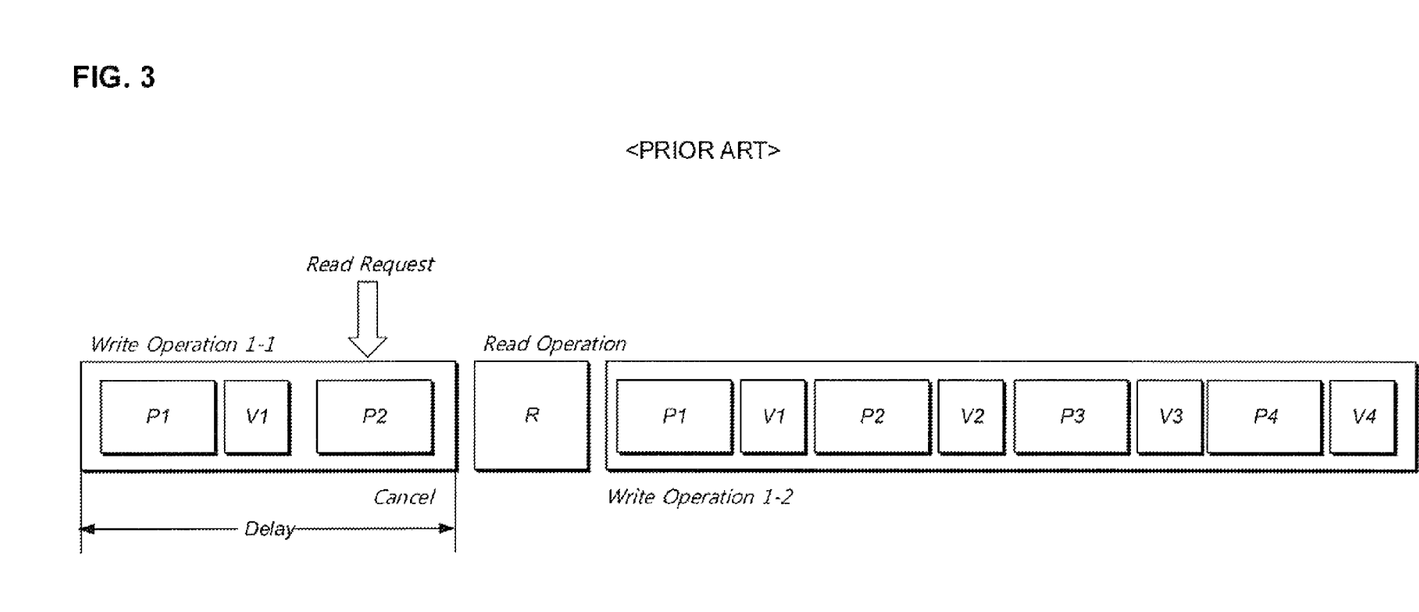

FIGS. 2 and 3 are diagrams for explaining a problem which may occur when a read request is inputted during a write operation.

Referring now to FIG. 2, when a read request is inputted while a write operation is performed through a plurality of program and verify operations as illustrated in FIG. 2 (i.e., P1 and V1, P2 and V2, P3 and V3, and P4 and V4), a read operation (i.e., R) may be performed after the write operation has ended. In this case, since a waiting time (i.e., Delay) for the read request is required until the write operation is completed, the performance may be degraded by the waiting time.

Furthermore, referring now to FIG. 3, a programming and verifying operation which has been already performed for a write operation (i.e., Write Operation 1-1) may be ignored (i.e., cancel), and the write operation (i.e., Write Operation 1-2) may be restarted from the beginning after a read request (i.e., R) is processed. In this case, the performance may be degraded by the time required for performing the ignored program and verify operation (i.e., Write Operation 1-1).

SUMMARY

In an embodiment, a semiconductor memory device may include a memory cell array, and a program and verify (PNV) circuit configured to perform a write operation on the memory cell array by repeating a plurality of programming and verifying operations. When the write operation is stopped after a first program operation is performed according to a first program condition, the PNV circuit may perform a first verify operation corresponding to the first program operation according to a first target value, after the write operation has resumed.

In an embodiment, a memory system may include a semiconductor memory device including a memory cell array, and a PNV circuit configured to perform a write operation on the memory cell array through a plurality of programming and verifying operations. The memory system may also include a memory controller including a scheduler configured to set a processing order of a plurality of read and write requests and a command generator configured to generate a write command for a write request provided from the scheduler and provide the generated write command to the semiconductor memory device.

In an embodiment, an operating method of a semiconductor device may include programming data into a memory cell array according to a first program condition, in order to perform a write operation, and stopping the write operation. The operating method of the semiconductor device may also include performing a read operation on the memory cell array, reading the data programmed according to the first program command after the read operation is completed, and comparing the read data to a first target value to verify the program result.

DETAILED DESCRIPTION

Various embodiments will be described below in more detail with reference to the accompanying drawings. The various embodiments may, however, be embodied in different forms and should not be construed as limited to the embodiments set forth herein. Rather, these embodiments are provided so that this disclosure will be thorough and complete, and will fully convey the scope of the description to those skilled in the art. Throughout the disclosure, like reference numerals refer to like parts throughout the various figures and embodiments.

Various embodiments may be directed to a semiconductor memory device of which the operation performance may be improved when a read request is to be processed while a write operation is performed through a plurality of programming and verifying operations, a memory system including the same, and an operating method thereof.

Figure 4A:
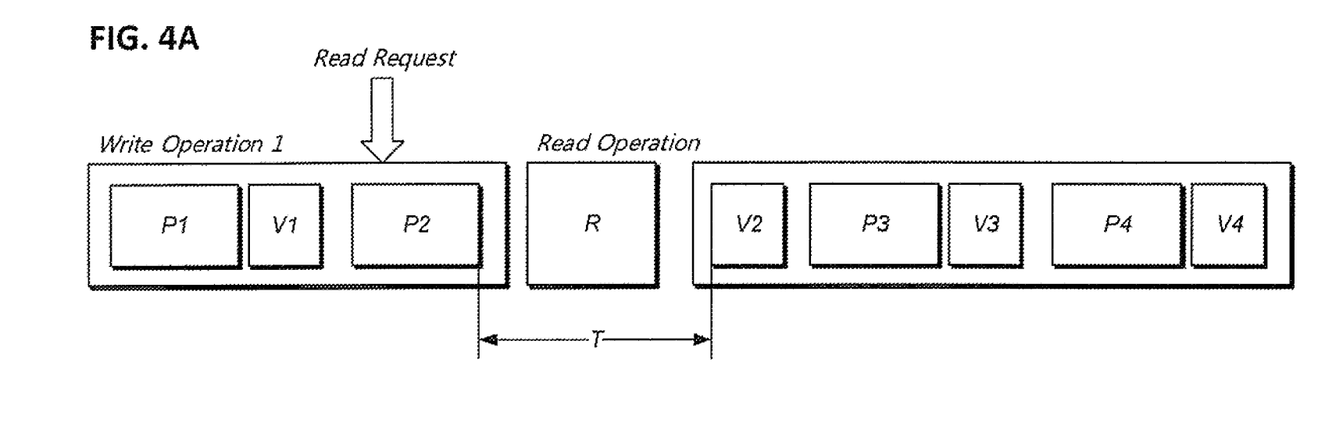
FIGS. 4A and 4B are diagrams for explaining a write operation in a semiconductor device in accordance with an embodiment.
Figure 4B:
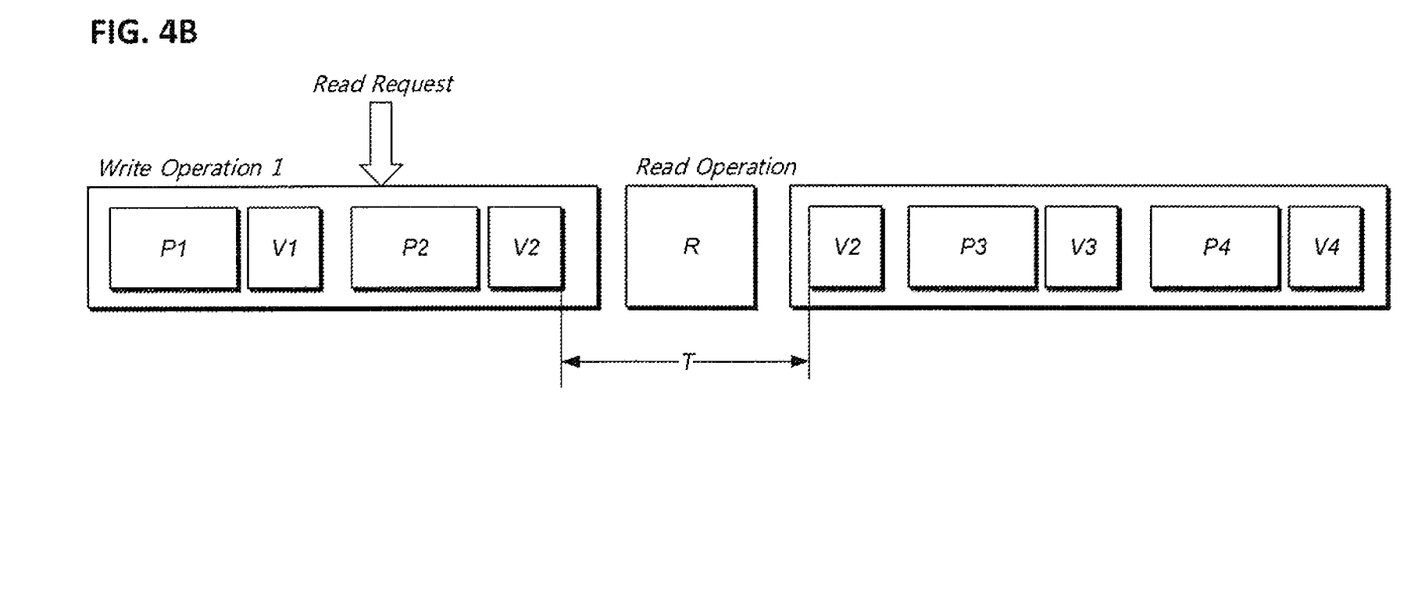

FIGS. 4A and 4B are diagrams for explaining a write operation in a semiconductor device in accordance with an embodiment.

In an embodiment, when a read request is inputted while a plurality of programming and verifying operations are repeated to perform a write operation, the read request may first be processed, and then the programming and verifying operations may be resumed.

When the programming and verifying operations are resumed, the verifying operation corresponding to the previous programming operation may be first performed before the program and verify operation of the next cycle is performed.

FIG. 4A illustrates the embodiments in which a read request may be processed after a program operation P2 of a second cycle has ended. FIG. 4B illustrates the embodiments in which a read request may be processed after a program and verify operation P2 and V2 of the second cycle has ended.

In either embodiments, after the read request has been completely processed, the verify operation V2 may be first performed, and then a program and verify operation P3 and V3 of the next cycle may be performed. When a preset condition is satisfied during the verify operation V2, the program and verify operation of the next cycle may not be performed.

For a time T required for processing the read request, the characteristics of a memory cell may be changed. In the cases of PCRAM (Phase Change Random Access Memory), a drift may occur. When the drift occurs, the resistance value of a memory cell based on each logic level may change with time.

Hereafter, PCRAM will be taken as an example of a semiconductor memory device, in order to describe an embodiment. PCRAM is an example of a semiconductor memory device in which the characteristics of the memory cells change with time, and the present disclosure is not limited thereto.

Figure 5:
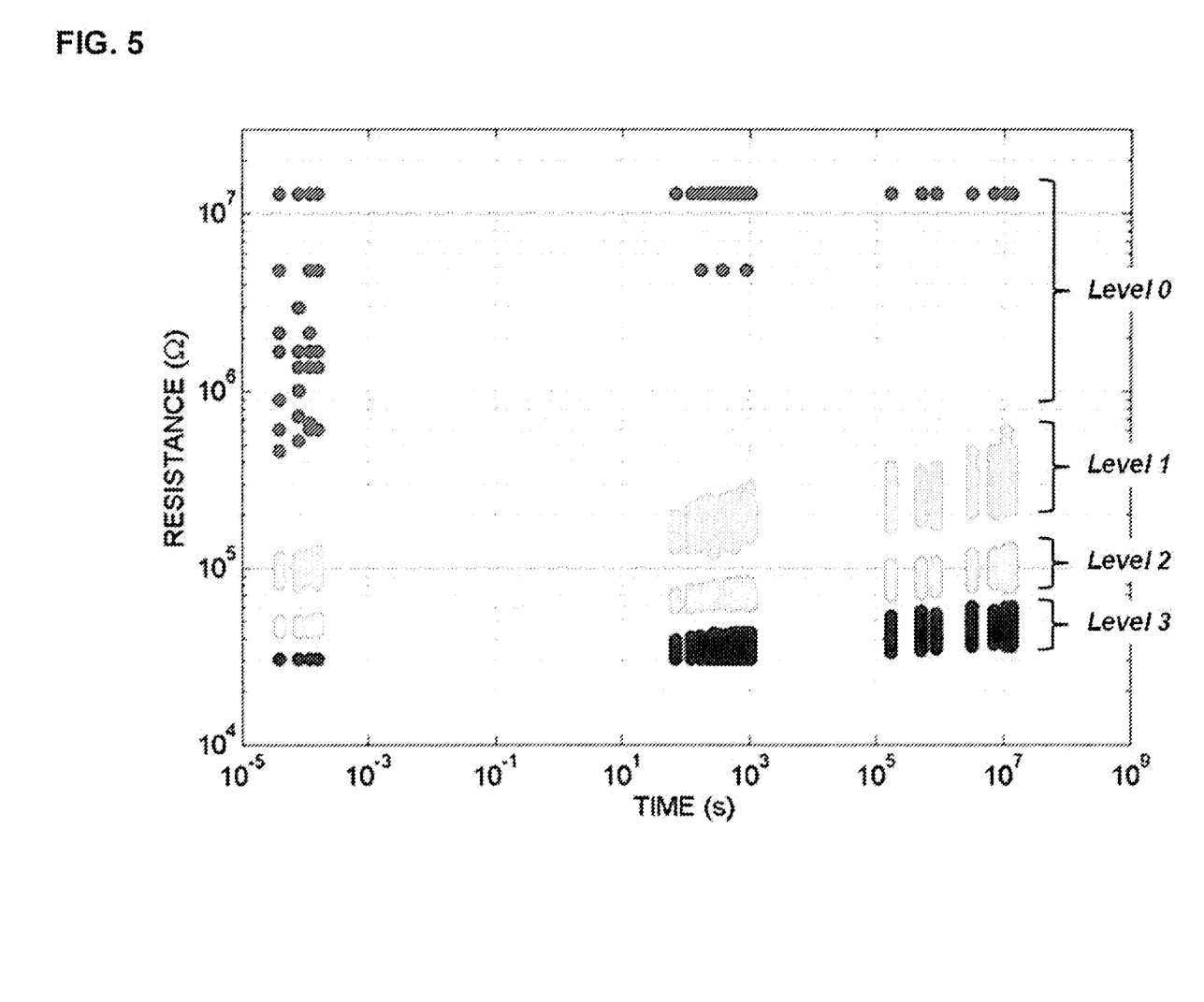
FIG. 5 is a graph for explaining a drift which may occur in a PCRAM including multi-level cells.

FIG. 5 is a graph for explaining a drift which may occur in a PCRAM including multi-level cells.

Referring to FIG. 5, resistance distributions corresponding to level 0 (00), level 1 (01), level 2 (10), and level 3 (11) may change with time. Thus, an error may occur, when a threshold resistance value which has been used during a data program operation is reused to verify data.

In an embodiment, when a write operation is stopped and then resumed, a drift may occur during the stop time.

Thus, during a verifying operation which is performed when the write operation has resumed, a target value into which a drift caused by the elapsed time is reflected may be used. At this time, the target value may be set according to the range of resistance distributions of logic levels which are to be written at the corresponding time point. The target value may be given as a range defined by a minimum value and a maximum value.

In a general read operation for PCRAM, information on the time at which data was written to a memory cell cannot be acquired. Thus, it may be difficult to estimate to which extent a drift occurred. In an embodiment, however, the time during which a write operation is stopped to process a read request may be measured to estimate to what extent a drift occurred.

A PCRAM maker may secure how much the characteristics of memory cells change with time due to a drift, through a pre-experiment. In these cases, it may be possible to determine the range of resistance values corresponding to each logic level in accordance with time.

For example, the information on the drift may be stored in the form of a lookup table. The lookup table may store a range of resistance values corresponding to a logic level at each elapsed time of 1 us or 1 ms. The lookup table will be described further with reference to FIG. 8.

Figure 6:
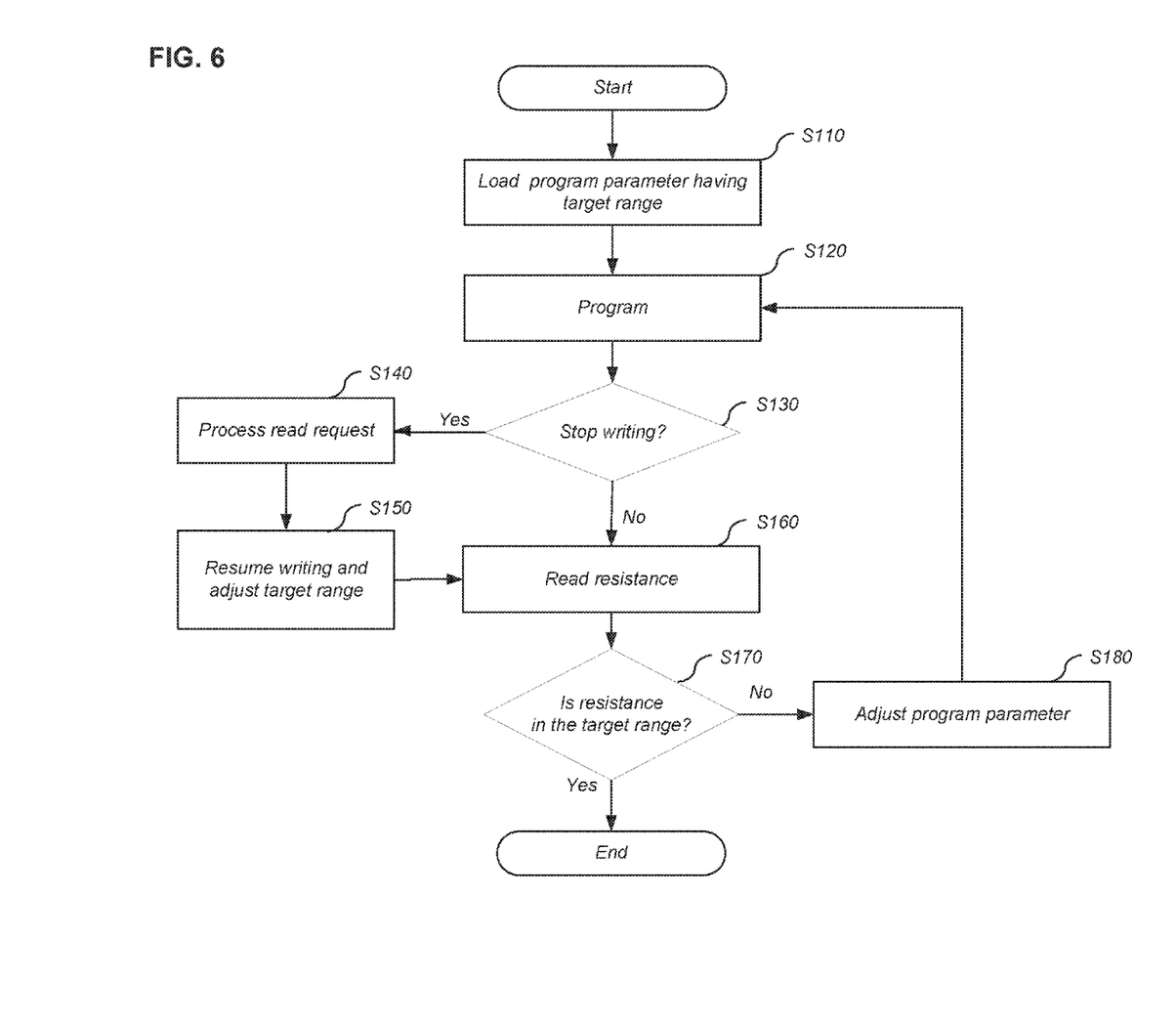
FIG. 6 is a flowchart illustrating a representation of the operation of the semiconductor memory device in accordance with the various embodiments.

FIG. 6 is a flowchart illustrating a representation of the operation of the semiconductor memory devices in accordance with the various embodiments.

First, at step S110, a program condition corresponding to a logic level to be programmed may be loaded.

Then, at step S120, data corresponding to the logic level may be programmed into a memory cell array.

Then, at step S130, whether an interrupt command for a write operation, caused by a read request to be preferentially processed, is inputted may be checked.

When the read request exists (i.e., Yes), the read request may be processed at step S140. According to the time required for processing the read request, a modified target value may be used to resume the write operation at step S150.

When no read request exists, a basically set target value may be used as it is.

Then, at step S160, the resistance value of a memory cell may be read. Whether the resistance value is included in the target value may be verified at step S170.

When the resistance value is included in the target value (i.e., Yes), the operation may be immediately ended (i.e., End). Otherwise (i.e., No), the program condition may be modified at step S180, and the program operation at step S120 may be performed to start a new programming and verifying operation cycle.

Figure 7:
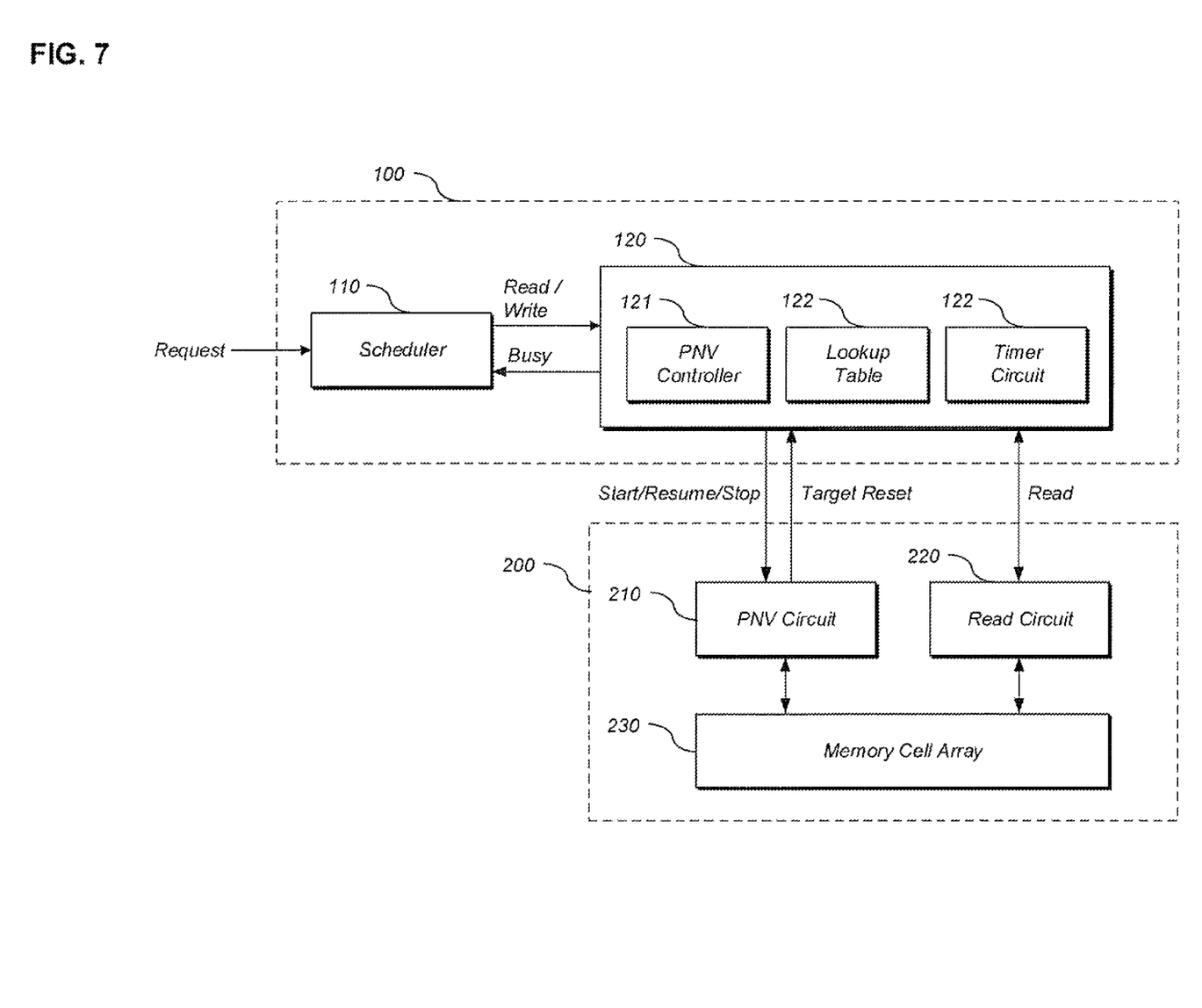
FIG. 7 is a block diagram illustrating a representation of a memory system in accordance with an embodiment.

FIG. 7 is a block diagram illustrating a representation of a memory system in accordance with an embodiment.

The memory system in accordance with an embodiment may include a memory controller 100 and a semiconductor memory device 200.

The memory controller 100 may include a scheduler 110 and a command generator 120. The scheduler 110 may receive read or write requests provided from outside the memory controller, and may determine a processing order of the read or write requests. The command generator 120 may generate a command in response to a selected request. The command generator 120 may provide the generated command to the semiconductor memory device 200.

The command generator 120 may generate read and write commands and provide the generated read and write commands to the semiconductor memory device 200. The write command may be processed by repeating a plurality of programming and verifying operations.

For this operation, the command generator 120 may include a PNV controller 121, a lookup table 122, and a timer circuit 122.

The PNV controller 121 may provide a write start command, a write stop command, and a write resume command to the semiconductor memory device 200 (i.e., Start/Resume/Stop).

The lookup table 122 may store the time required until a write operation is resumed after the write operation has stopped and a target value corresponding to a logic level of data.

Figure 8:
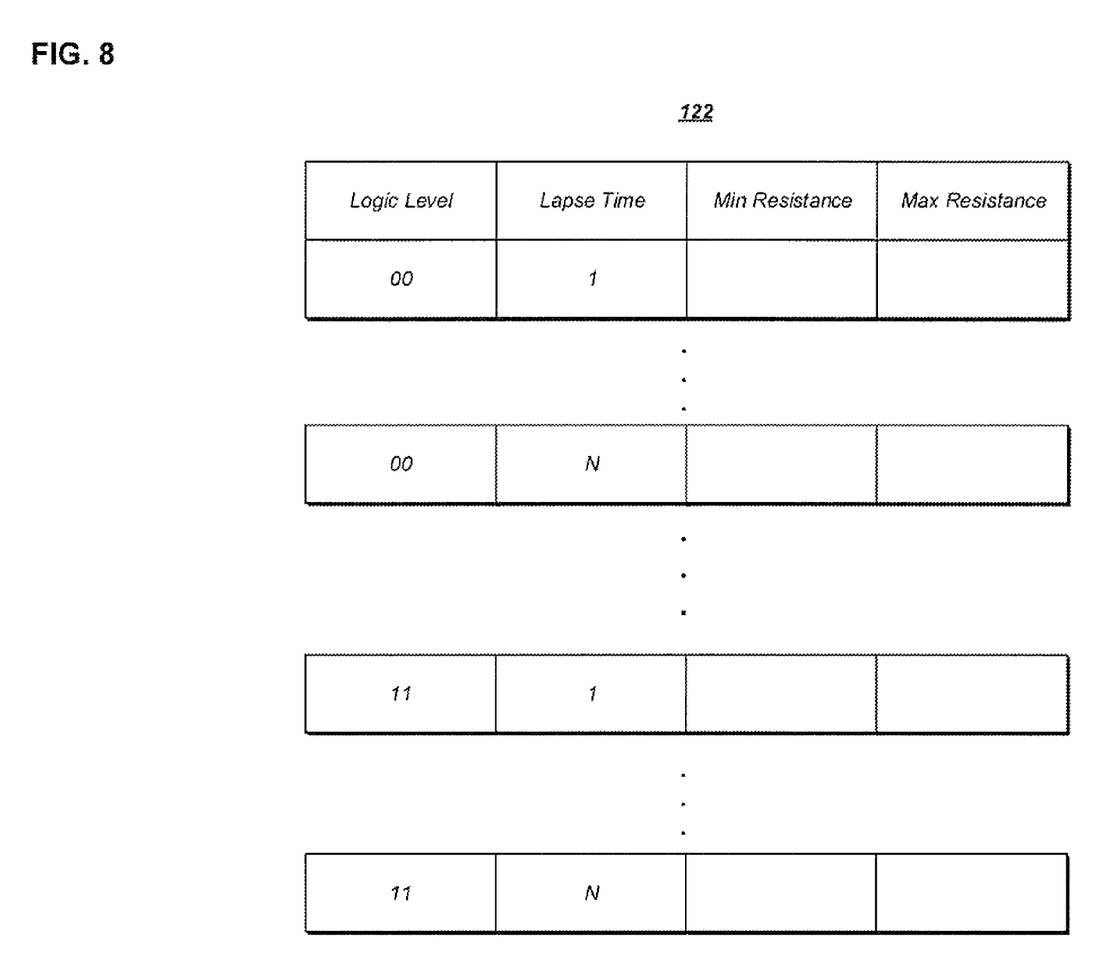
FIG. 8 is a diagram illustrating a representation of the data structure of a lookup table of FIG. 7.

FIG. 8 is a diagram illustrating a representation of the data structure of the lookup table 122 for a PCRAM cell configured to store a 2-bit logic level. Referring to FIG. 8, an elapsed time may be set to an integer multiple of the unit time T. At this time, the unit time may be set to μs or ms.

In FIG. 8, the lookup table 122 may be set in such a manner that a minimum resistance value and a maximum resistance value correspond to each logic level and elapsed time. At this time, the minimum resistance value and the maximum resistance value may be previously set according to the result of a test for the characteristic of the memory cell.

The lookup table 122 may store substitute values in mathematical functional relation with the minimum resistance value and the maximum resistance value, instead of the maximum resistance value and the minimum resistance value.

The timer circuit 122 may measure a time required until the write operation is resumed after the write operation has stopped.

The PNV controller 121 may generate a write start command when a write request is inputted from the scheduler 110. However, when a write command is being executed on the same bank as the write request, the PNV controller 121 may provide a busy signal to the scheduler 110 (see FIG. 7).

The write start command may be provided to a PNV circuit 210 of the semiconductor memory device 200.

The PNV circuit 210 may program data into the memory cell array 230, read the programmed data from the memory cell array 230, and verify whether the read data has been included in the target value. When the read data is not included in the target value, the PNV circuit 210 may modify the program condition and repeat the above-described program and verify operation.

Figure 9:
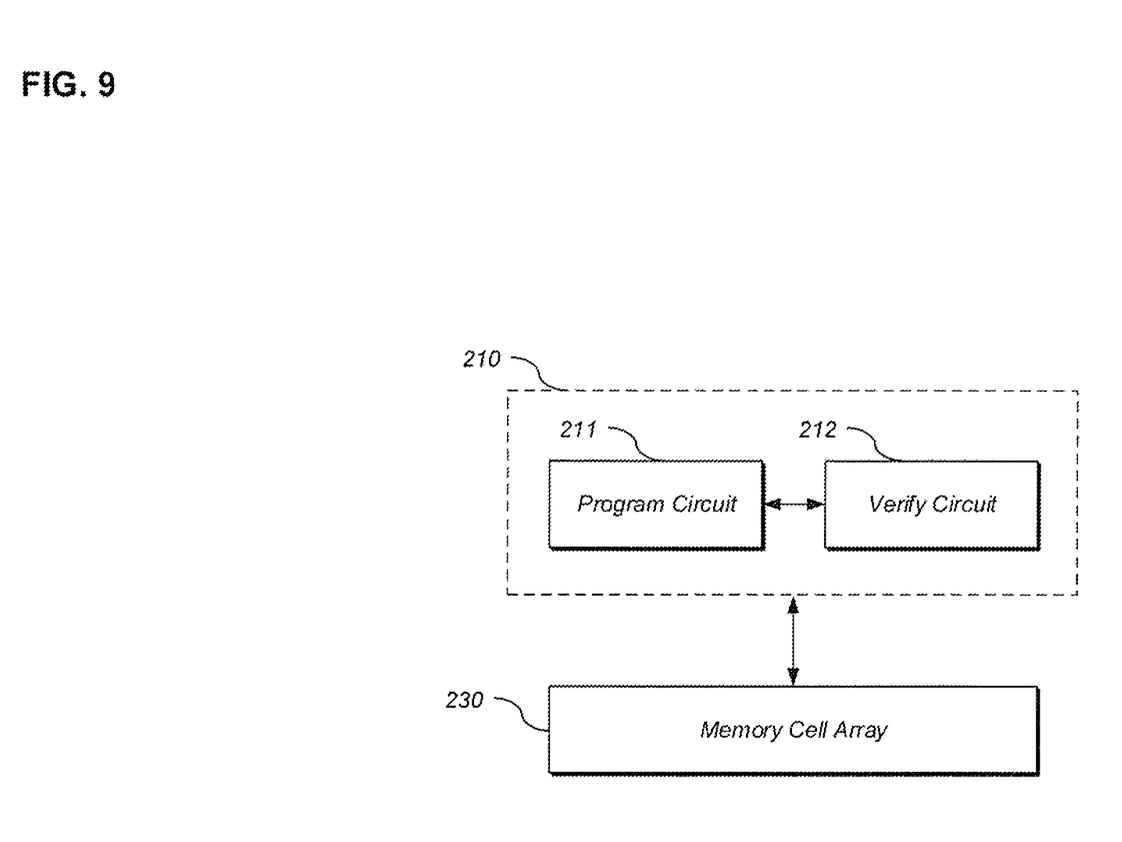
FIG. 9 is a block diagram illustrating a representation of the configuration of a PNV circuit of FIG. 5.

FIG. 9 is a block diagram illustrating a representation of the configuration of the PNV circuit 210. The PNV circuit 210 may include a program circuit 211 and a verify circuit 212. The program circuit 211 may program data to the memory cell array 230 according to the program condition. The verify circuit 212 may compare the data programmed in the memory cell array 230 to the target value so as to verify the program result.

The PNV circuit 210 may previously store a target value based on the logic level of the data. In an embodiment, the PNV circuit 210 may receive a target value based on the logic level of data from the PNV controller 121. In these cases, the lookup table 122 may additionally store information corresponding to when the elapsed time is 0.

The PNV controller 212 may provide a write stop command to the semiconductor memory device 200, when a read request is inputted from the scheduler 110 and a write command is being executed on the same bank as the read request.

The PNV circuit 210 may stop the program and verify operation of the current cycle, which has been performed by the PNV circuit 210, when the write stop command is provided. At this time, at least the program operation may be completed in the program and verify operation of the current cycle. The PNV circuit 210 may stop the program and verify operation, and provide a target reset signal for resetting the target value to the PNV controller 121.

Then, the command generator 120 may provide a read command to the semiconductor memory device 200, and the read circuit 220 of the semiconductor memory device 200 may read data from the semiconductor memory device 200 and output the read data to the memory controller 100.

When the execution of the read command is ended, the PNV controller 121 may provide a write resume command to the PNV circuit 210. At this time, the PNV controller 121 may measure a time elapsed until the write operation is resumed after the write operation is stopped, using the timer circuit 122.

Furthermore, the PNV controller 121 may verify a corresponding target value by referring to the elapsed time and the logical value of the data programmed at the current cycle through the lookup table 122. The PNV controller 121 may provide the write resume command and the verified target value to the PNV circuit 210.

Then, the PNV circuit 210 may repeat the verify operation of the current cycle. Although the verify operation was already performed before the program and verify operation of the current cycle is stopped, the PNV circuit 210 may repeat the verify operation of the current cycle.

The verify operation may be based on the new target value provided from the PNV controller 121. That is, when the data read from the memory cell array 230 is included in the new target value during the verify operation, the verify operation is determined to be successfully performed, and the write operation may be ended.

When a program and verify operation of a new cycle is additionally performed, a target value used for the verify operation of the new cycle may be based on the target value which is basically set in the PNV circuit 210.

In accordance with the embodiments, when a read request needs to be processed while a write operation is performed through a plurality of program and verify operations, a waiting time may not be wasted, and the performance may be improved. Furthermore, even when a write operation is temporarily stopped while the write operation is performed by repeating a program and verify operation, influence caused by the characteristic changes of memory cells may be removed to more precisely perform the write operation.

The semiconductor memory devices and memory controllers discussed above (see FIGS. 4A-9) are particular useful in the design of memory devices, processors, and computer systems. For example, referring to FIG. 10, a block diagram of a system employing the semiconductor memory device and/or memory controller (i.e., 100) in accordance with the embodiments are illustrated and generally designated by a reference numeral 1000. The system 1000 may include one or more processors or central processing units ("CPUs") 1100. The CPU 1100 may be used individually or in combination with other CPUs. While the CPU 1100 will be referred to primarily in the singular, it will be understood by those skilled in the art that a system with any number of physical or logical CPUs may be implemented.

Figure 10:
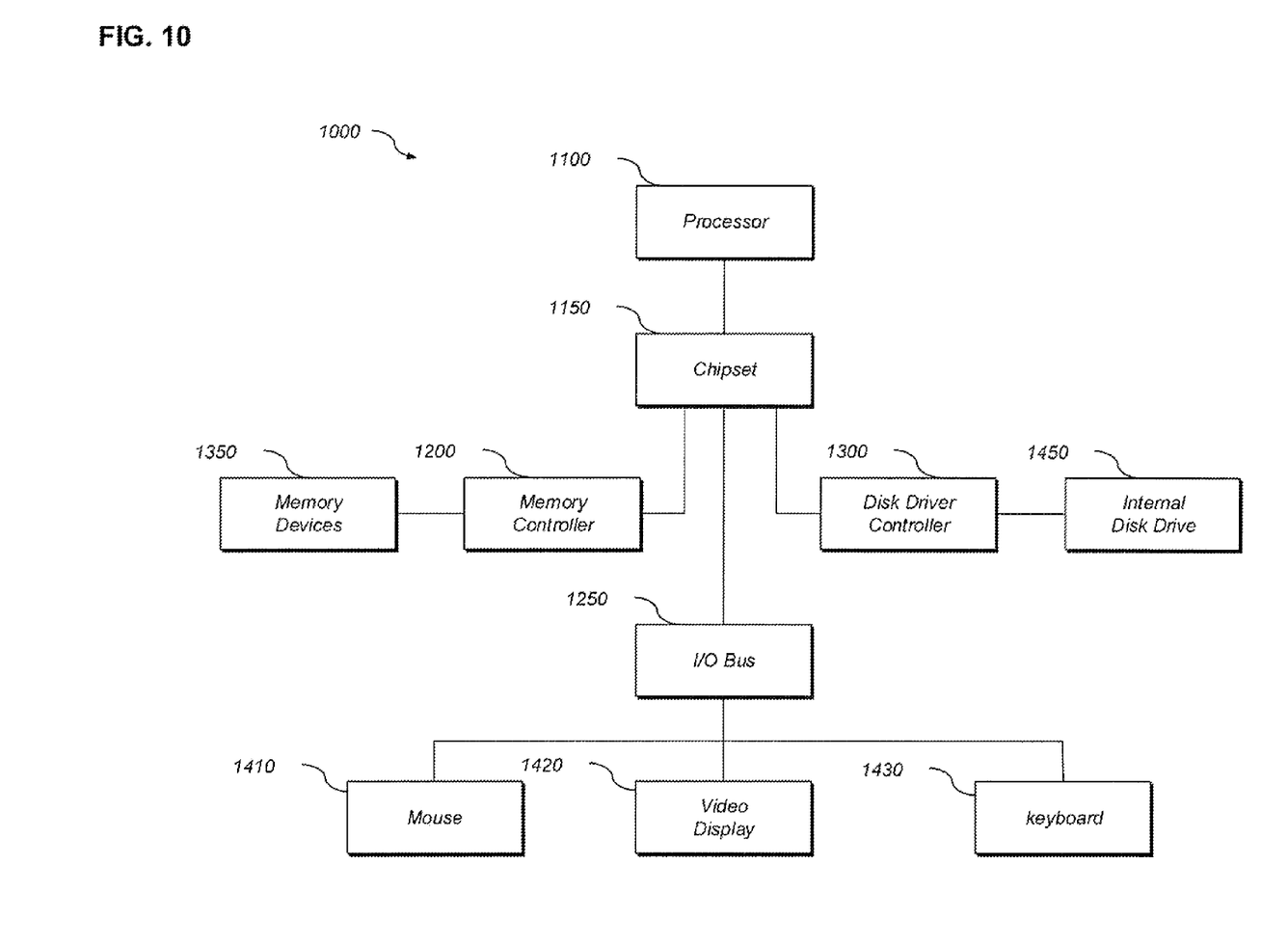
FIG. 10 illustrates a block diagram of an example of a representation of a system employing the memory controller and semiconductor memory device in accordance with the embodiments discussed above with relation to FIGS. 4A-9.

A chipset 1150 may be operably coupled to the CPU 1100. The chipset 1150 is a communication pathway for signals between the CPU 1100 and other components of the system 1000, which may include a memory controller 1200, an input/output ("I/O") bus 1250, and a disk drive controller 1300. Depending on the configuration of the system, any one of a number of different signals may be transmitted through the chipset 1150, and those skilled in the art will appreciate that the routing of the signals throughout the system 1000 can be readily adjusted without changing the underlying nature of the system.

As stated above, the memory controller 1200 may be operably coupled to the chipset 1150. The memory controller 1200 may include at least one semiconductor memory device and/or memory controller (i.e., 100 see for example FIG. 7) as discussed above with reference to FIGS. 4A-9. Thus, the memory controller 1200 can receive a request provided from the CPU 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may include the at least one semiconductor memory device and/or at least one memory controller 100 see for example FIG. 7) as discussed above with relation to FIGS. 4A-9, the memory devices 1350 may include a plurality of word lines and a plurality of bit lines for defining a plurality of memory cell. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430. Further, the I/O bus 1250 may be integrated into the chipset 1150.

The disk drive controller 1450 (i.e., internal disk drive) may also be operably coupled to the chipset 1150. The disk drive controller 1450 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

It is important to note that the system 1000 described above in relation to FIG. 10 is merely one example of a system employing the semiconductor memory device and/or memory controller (i.e., 100 see for example FIG. 7) as discussed above with relation to FIGS. 4A-9. In alternate embodiments, such as cellular phones or digital cameras, the components may differ from the embodiments illustrated in FIG. 10.

Although various embodiments have been described for illustrative purposes, it will be apparent to those skilled in the art that various changes and modifications may be made without departing from the spirit and scope of the disclosure as defined in the following claims.

What is claimed is:

1. A semiconductor memory device comprising:
   a memory cell array; and
   a program and verify (PNV) circuit configured to perform a write operation on the memory cell array by repeating a plurality of programming and verifying operations,
   wherein when the write operation is stopped after a first program operation according to a first program condition is performed, the PNV circuit performs a first verify operation according to an adjusted first target value after the write operation has resumed before performing a second program operation, wherein the first verify operation corresponds to the first program operation, wherein the adjusted first target value is adjusted from a first target value according to the amount of time during which the write operation is stopped, and wherein the first target value is a predetermined value for the first verify operation if the write operation is not stopped.

2. The semiconductor memory device of claim 1, wherein the PNV circuit comprises:
   a program circuit configured to perform the first program operation according to the first program condition; and
   a verify circuit configured to read data written through the first program operation from the memory cell array, and compare the read data to the adjusted first target value to verify the first program operation.

3. The semiconductor memory device of claim 2, wherein the program circuit further performs the second program operation according to a second program condition, when the first verify operation is not satisfied.

4. The semiconductor memory device of claim 3, wherein the verify circuit reads data written through the second program operation from the memory cell array, and compares the read data to a second target value so as to verify the program result.

5. The semiconductor memory device of claim 4, wherein the memory cell array comprises phase change memory cells,
   the adjusted first target value is a value which is adjusted by reflecting to which extent a drift occurred during the stop time, and
   the second target value is a value unrelated to the extent of the drift.

6. The semiconductor memory device of claim 4, wherein the memory cell array comprises phase change memory cells including multi-level cells,
   the adjusted first target value is a value which is adjusted by reflecting to which extent a drift occurred during the stop time, and
   the second target value is a value unrelated to the extent of the drift.

7. A memory system comprising:
   a semiconductor memory device comprising a memory cell array and a program and verify (PNV) circuit configured to perform a write operation on the memory cell array through a plurality of programming and verifying operations; and
   a memory controller comprising a scheduler configured to set a processing order of a plurality of read and write requests, and a command generator configured to generate a write command for a write request provided from the scheduler and provide the generated write command to the semiconductor memory device
   , wherein when the write operation is stopped after a first program operation according to a first program condition is performed, the PNV circuit performs a first verify operation according to an adjusted first target value after the write operation is resumed, wherein the first verify operation corresponds to the first program operation, wherein the adjusted first target value is adjusted from a first target value according to the amount of time during which the write operation is stopped, and wherein the first target value is a predetermined value for the first verify operation if the write operation is not stopped.

8. The memory system of claim 7, wherein the PNV circuit comprises:
- a program circuit configured to perform the first program operation according to the first program condition; and
- a verify circuit configured to read data written through the first program operation from the memory cell array, and compare the read data to the adjusted first target value to verify the program result.

9. The memory system of claim 7, wherein the command generator comprises:
- a PNV controller configured to control starting, stopping, and resuming the write operation;
- a timer circuit configured to measure the stop time of the write operation; and
- a lookup table configured to store the first target value.

10. The memory system of claim 9,
wherein the lookup table is configured to store a minimum resistance value and a maximum resistance value for each logic level corresponding to a memory cell of the memory cell array, and
wherein the first target value, minimum resistance value, and the maximum resistance values are adjusted according to the amount of time during which the write operation is stopped.

11. The memory system of claim 9, wherein the PNV controller controls the PNV circuit to stop the write operation, when a read request is provided from the scheduler while the write operation is performed.

12. The memory system of claim 11, wherein the PNV controller controls the PNV circuit to resume the stopped write operation after the read request is completely processed.

13. The memory system of claim 12, wherein the PNV controller provides the adjusted first target value corresponding to the stop time to the PNV circuit, when issuing an instruction to resume the stopped write operation.

14. An operating method of a semiconductor device, comprising:
- programming data into a memory cell array according to a first program condition as a first program operation, in order to perform a write operation;
- stopping the write operation, and processing a read request on the memory cell array; and
- reading the data programmed according to the first program condition and after the read request is processed, and
- comparing the read data to an adjusted first target value to verify the first program operation as a first verify operation,
wherein the adjusted first target value is adjusted from a first target value according to the amount of time during which the write operation is stopped and wherein the first target value is a predetermined value for the first verify operation if the write operation is not stopped.

15. The operating method of claim 14, further comprising:
- programming the data according to a second program condition, when the first program condition is not satisfied; and reading the data programmed according to the second program condition and comparing the read data to a second target value.

* * * * *